United States Patent
Wong et al.

(10) Patent No.: US 11,665,691 B2
(45) Date of Patent: May 30, 2023

(54) COMMUNICATIONS DEVICES AND METHODS

(71) Applicant: Sony Corporation, Tokyo (JP)

(72) Inventors: Shin Horng Wong, Basingstoke (GB); Martin Warwick Beale, Basingstoke (GB); Brian Alexander Martin, Basingstoke (GB); Vivek Sharma, Basingstoke (GB); Hideji Wakabayashi, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 675 days.

(21) Appl. No.: 16/475,691

(22) PCT Filed: Dec. 5, 2017

(86) PCT No.: PCT/EP2017/081501
§ 371 (c)(1),
(2) Date: Jul. 3, 2019

(87) PCT Pub. No.: WO2018/127339
PCT Pub. Date: Jul. 12, 2018

(65) Prior Publication Data
US 2019/0380140 A1    Dec. 12, 2019

(30) Foreign Application Priority Data
Jan. 5, 2017  (EP) .................................. 17150482

(51) Int. Cl.
*H04W 72/12* (2023.01)
*H04W 72/20* (2023.01)
*H04L 5/00* (2006.01)
(Continued)

(52) U.S. Cl.
CPC ........... *H04W 72/20* (2023.01); *H04L 5/0094* (2013.01); *H04W 88/06* (2013.01); *H04W 88/10* (2013.01)

(58) Field of Classification Search
CPC .. H04B 7/0417; H04B 7/0486; H04B 7/0626; H04B 7/0632; H04B 7/0639;
(Continued)

(56) References Cited

U.S. PATENT DOCUMENTS

| 2012/0140743 | A1* | 6/2012 | Pelletier | H04W 88/06 |
| | | | | 370/335 |
| 2013/0223402 | A1* | 8/2013 | Feng | H04L 5/0023 |
| | | | | 370/336 |
| 2018/0020462 | A1* | 1/2018 | Xiong | H04W 72/1215 |

FOREIGN PATENT DOCUMENTS

WO    2016/137532 A1    9/2016

OTHER PUBLICATIONS

International Search Report and Written Opinion dated Feb. 26, 2018 for PCT/EP2017/081501 filed on Dec. 5, 2017, 10 pages.
(Continued)

*Primary Examiner* — Joseph E Avellino
*Assistant Examiner* — Mon Cheri S Davenport
(74) *Attorney, Agent, or Firm* — Xsensus LLP

(57) ABSTRACT

Communicating in a wireless telecommunications system comprising a communications device and one or more infrastructure equipment, wherein the communications device is configured to communicate with the infrastructure equipment via a first wireless access interface in accordance with a first radio access technology (RAT) and to communicate with the infrastructure equipment via a second wireless access interface in accordance with a second RAT. An exemplary process includes receiving, at the communications device via the first wireless access interface, control signalling from one of the infrastructure equipment, the
(Continued)

control signalling comprising an indication of first communications resources to be used by the communications device to communicate via the second wireless access interface, and transmitting, from the communications device, the signals representing data to and/or receiving, at the communications device, the signals representing data from, using the first communications resources, the one of the infrastructure equipment via the second wireless access interface.

20 Claims, 8 Drawing Sheets

(51) Int. Cl.
*H04W 88/06* (2009.01)
*H04W 88/10* (2009.01)

(58) Field of Classification Search
CPC .......... H04L 1/0026; H04L 2001/0098; H04L 5/0007; H04L 5/0048; H04L 5/0057; H04L 5/0064; H04W 72/0413
See application file for complete search history.

(56) References Cited

OTHER PUBLICATIONS

Qualcomm Incorporated, "New Work Item: NarrowBand IOT (NB-IOT)", 3GPP TSG RAN Meeting No. 69 RP-151621, Phoenix, USA, Sep. 14-16, 2015, 8 pages.

Holma et al., "LTE for UMTS OFDMA and SC-FDMA Based Radio Access", Wiley 2009, System Architecture Based on 3GPP SAE, 11 pages.

Huawei et al., "Coexistence between NR and LTE", 3GPP TSG RAN WG1 Meeting No. 87 R1-1611681, Reno, USA, Nov. 14-18, 2016, pp. 1-6.

Vodafone Group PLC, "Uplink operation for LTE+NR Dual Connectivity", 3GPP TSG RAN WG1 Meeting No. 87 R1-1612887, Reno, USA, Nov. 14 -18, 2016, 3 pages.

NTT Docomo, "New SID Proposal: Study on New Radio Access Technology", 3GPP TSG RAN Meeting No. 71 RP-160671, Göteborg, Sweden, Mar. 7-10, 2016, 8 pages.

\* cited by examiner

COMMUNICATIONS DEVICES AND METHODS

CROSS-REFERENCE TO RELATED APPLICATIONS

The present application is based on PCT filing PCT/EP2017/081501, filed Dec. 5, 2017, which claims priority to EP 17150482.2, filed Jan. 5, 2017, the entire contents of each are incorporated herein by reference.

BACKGROUND

Field of Disclosure

The present disclosure relates to communications devices which are configured to transmit data to and receive data from infrastructure equipment of a wireless communications network, in accordance with at least one of a first radio access technology, RAT, and a second RAT.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the Third Generation Project Partnership (3GPP) defined Universal Mobile Telecommunications Standard (UMTS) and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to support efficiently connectivity for a wide range of devices associated with different applications with different characteristic data traffic profiles, resulting in different devices having different operating characteristics and/or requirements.

The introduction of new radio access technology (RAT) systems/networks therefore gives rise to new opportunities as well as challenges. One such challenge is how initially deploy new RAT systems, particularly when LTE systems will still be widespread.

SUMMARY OF THE DISCLOSURE

Embodiments of the present technique can provide methods which relate to communicating in a wireless telecommunications system comprising a communications device and one or more infrastructure equipment, wherein the communications device is configured to transmit signals to and receive signals from the infrastructure equipment via a first wireless access interface in accordance with a first radio access technology, RAT, and to transmit signals to and receive signals from the infrastructure equipment via a second wireless access interface in accordance with a second RAT, the second RAT being different to the first RAT.

In a first embodiment, the method comprises receiving, at the communications device via the first wireless access interface, control signalling from one of the infrastructure equipment, the control signalling comprising an indication of first communications resources to be used by the communications device to transmit/receive signals representing data to/from the one of the infrastructure equipment via the second wireless access interface, and transmitting, from the communications device, the signals representing data to and/or receiving, at the communications device, the signals representing data from, using the first communications resources, the one of the infrastructure equipment via the second wireless access interface.

In a second embodiment, the method comprises transmitting, by the communications device via the first wireless access interface, control signalling to one of the infrastructure equipment, the control signalling comprising physical uplink control information to be used by the one of the infrastructure equipment, the physical uplink control information relating to the second RAT.

Embodiments of the present technique, which further relate to communications devices, methods of operating communications devices, and circuitry for communications devices, may provide ways in which complexity of initial deployment of NR systems may be reduced, allowing for wider, faster and cheaper deployment of such systems.

It is known in prior art systems, such as that disclosed in [1], that NR uplink control information (UCI) can be transmitted in uplink resources used for LTE in order to indicate the status of NR transmissions, where the NR UCI is coded according to NR transmission formats. However, embodiments of the present technique relate to the transmission of new inter-RAT downlink control information (DCI) and inter-RAT UCI that can be transmitted using LTE transmission formats in order to indicate the status of NR transmissions.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

LTE Technology (4G)

Figure 1:
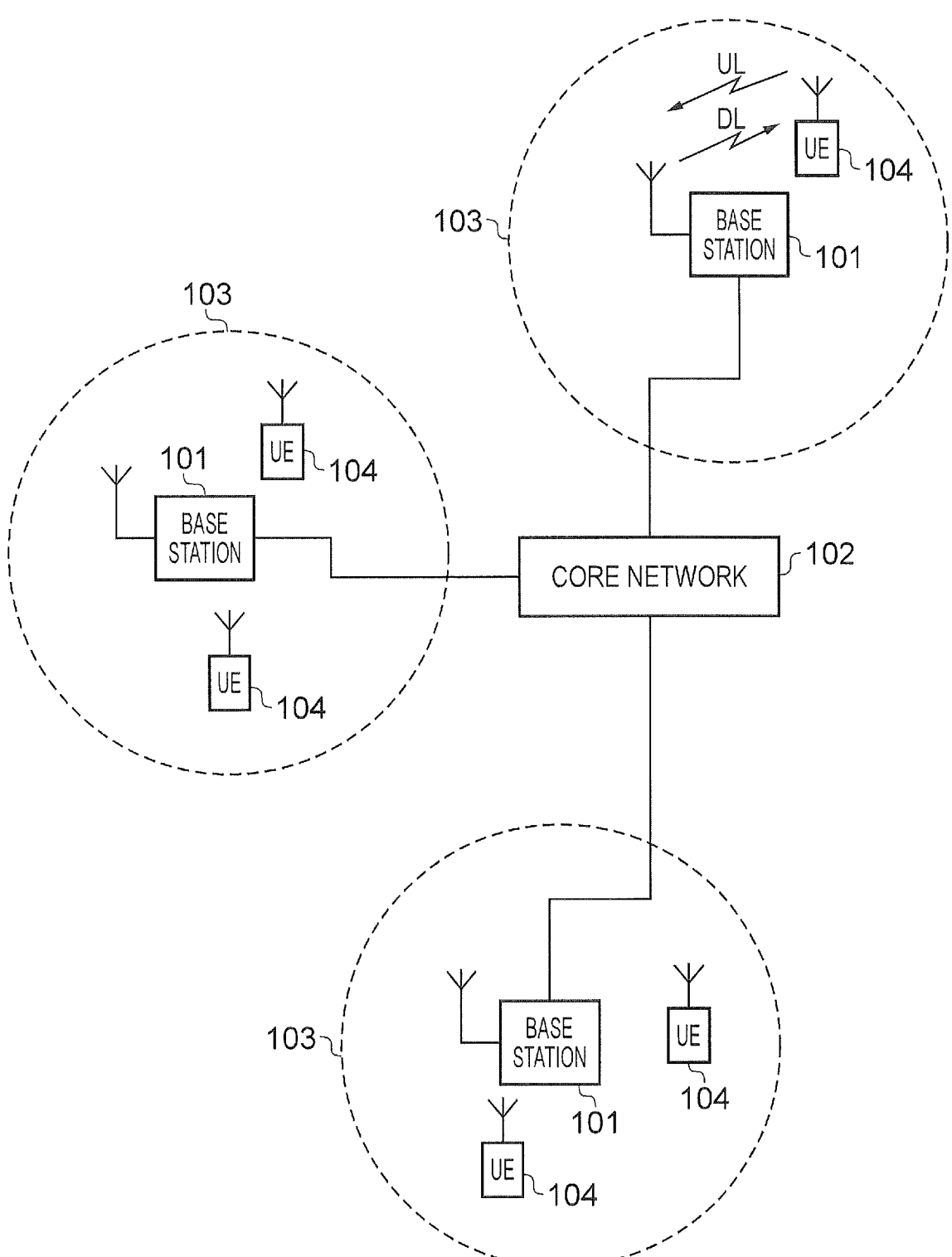
FIG. 1 is a schematic block diagram of a first wireless communications system with architectural components corresponding to that of a conventional LTE-based network.

FIG. 1 provides a schematic diagram illustrating some basic functionality of a mobile telecommunications network/system operating in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [2].

The network 100 includes a plurality of base stations 101 connected to a core network 102. Each base station provides a coverage area 103 (i.e. a cell) within which data can be communicated to and from communications devices 104. Data is transmitted from base stations 101 to communications devices 104 within their respective coverage areas 103 via a radio downlink. Data is transmitted from communications devices 104 to the base stations 101 via a radio uplink. The uplink and downlink communications are made using radio resources that are licensed for exclusive use by the operator of the network 100. The core network 102 routes data to and from the communications devices 104 via the respective base stations 101 and provides functions such as authentication, mobility management, charging and so on.

Wireless communications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink.

New Radio Access Technology (5G)

As mentioned above, the embodiments of the present invention can find application with advanced wireless communications systems such as those referred to as 5G or New Radio (NR) Access Technology. New Radio Access Technology (RAT) has been proposed in [3] to develop a new RAT for the next generation wireless communication system, i.e. 5G, and in 3GPP a Study Item (SI) on NR has been agreed [4] in order to study and develop the new RAT. The new RAT is expected to operate in a large range of frequencies, from hundreds of MHz to 100 GHz and it is expected to cover a broad range of use cases. The use cases that are considered under this SI include:

Enhanced Mobile Broadband (eMBB)
Massive Machine Type Communications (mMTC)
Ultra Reliable & Low Latency Communications (URLLC)

Figure 2:
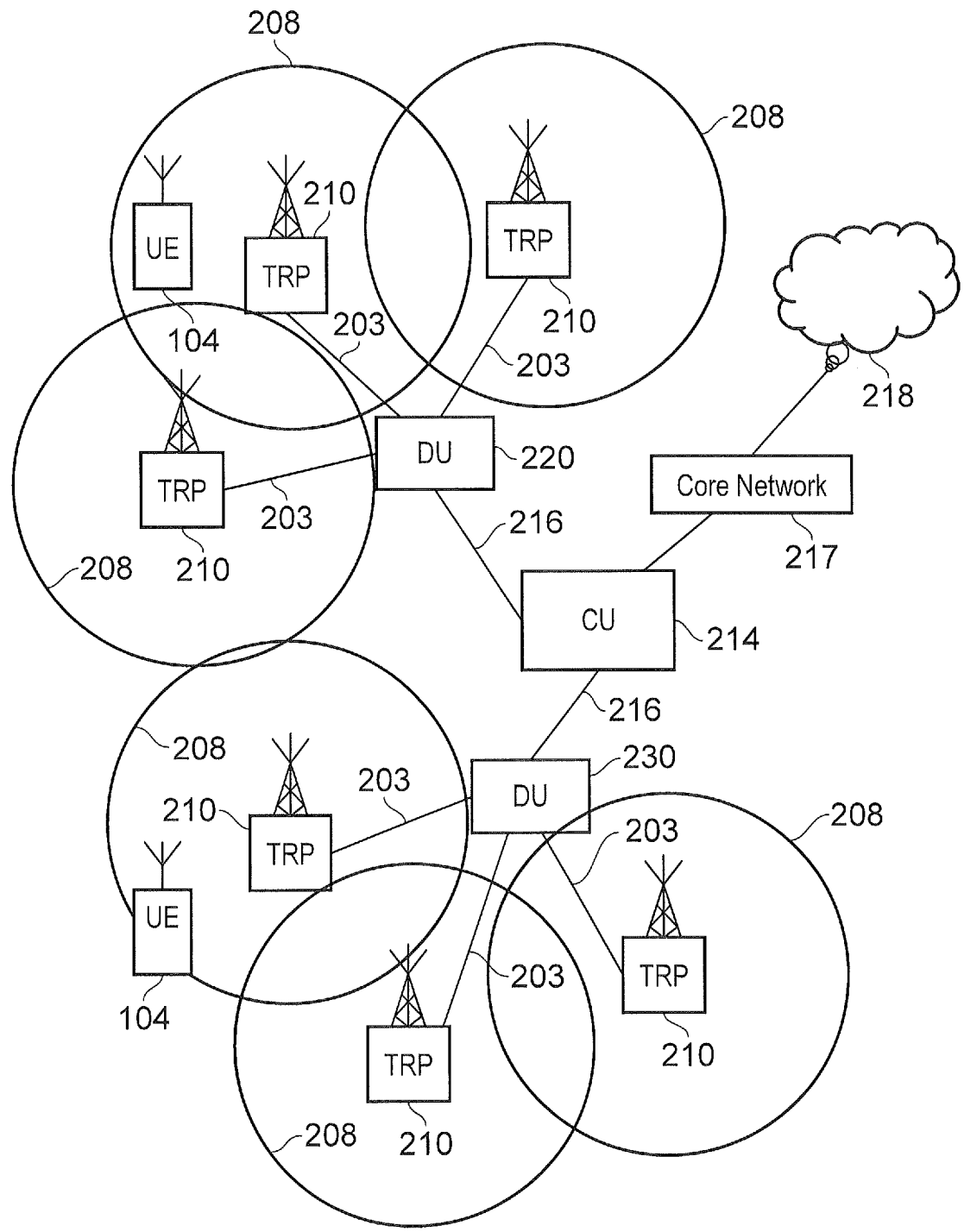
FIG. 2 is a schematic block diagram of a second wireless communications system with architectural components corresponding to that of an example enhanced new radio (NR) or 5G network.

The aim of 5G is not only mobile connectivity for people, but to provide ubiquitous connectivity for any type of device and any type of application that would benefit from being connected. Many requirements and use-cases are still being discussed, but amongst those are:

Low latency
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars)
Low device cost and energy consumption
Flexible spectrum usage
Flexible mobility An example configuration of a wireless communications network which uses some of the terminology proposed for NR and 5G is shown in FIG. 2. In FIG. 2 a plurality of transmission and reception points (TRP) 210 are connected to distributed control units (DU) 220, 230 by a connection interface represented as a line 203. Each of the transmitter receiver points (TRP) 210 is arranged to transmit and receive signals via a wireless access interface within a radio frequency bandwidth available to the wireless communications network. Thus within a range for performing radio communications via the wireless access interface, each of the TRP 210, forms a cell of the wireless communications network as represented by a dashed line 208. As such wireless communications devices 104 which are within a radio communications range provided by the cells 210 can transmit and receive signals to and from the TRP 210 via the wireless access interface. Each of the distributed control units 220, 230 are connected to a coordinating unit (CU) 214 via an interface 216. The CU 214 is then connected to the a core network 217 which may contain all other functions required for communicating data to and from the wireless communications devices and the core network 217 may be connected to other networks 218.

The elements of the wireless access network shown in FIG. 2 may operate in a similar way to corresponding elements of an LTE network such as that shown in FIG. 1. It will be appreciated that operational aspects of the telecommunications network represented in FIG. 2, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The TRPs 210 of FIG. 2 may in part have a corresponding functionality to a base station or eNodeB 101 of an LTE network, and so the terms TRP and eNodeB in the following description are interchangeable. Base stations, which are an example of radio network infrastructure equipment, may also be referred to as transceiver stations/NodeBs/eNodeBs (eNBs)/gNodeBs (gNBs), and so forth. Similarly the communications devices 104 may have a functionality corresponding to devices know for operation with an LTE network and may also be referred to as mobile stations, user equipment (UE), user terminal, terminal device, mobile radio, communications device, and so forth. It will be appreciated therefore that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of an LTE wireless communications network.

Figure 3:
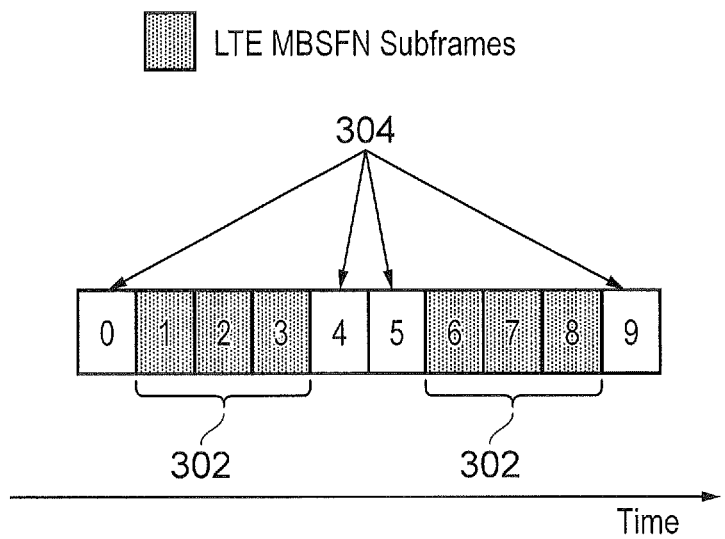
FIG. 3 shows an example of how LTE and NR transmissions may be differentiated between using time division multiplexing (TDM)
Figure 4:
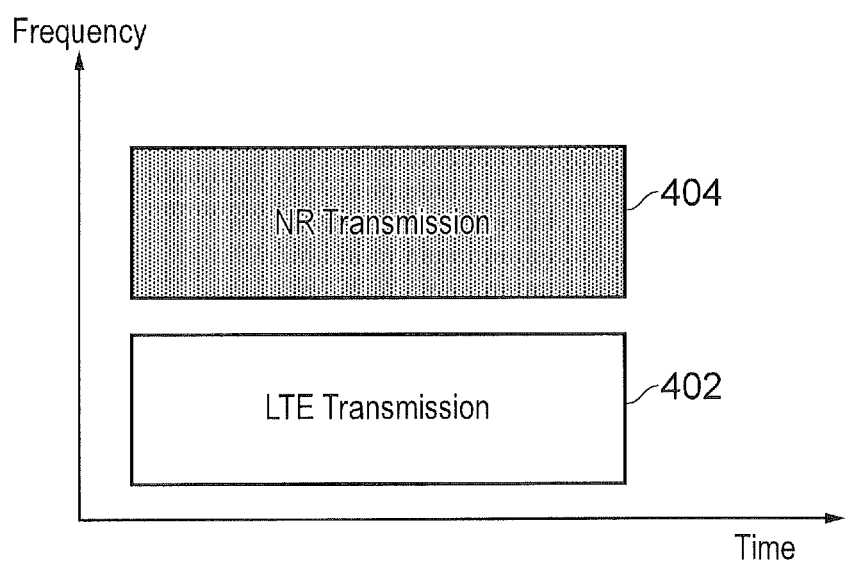
FIG. 4 shows an example of how LTE and NR transmissions may be differentiated between using frequency division multiplexing (FDM)

At least for initial deployment, NR and LTE are expected to coexist. Coexistence can be implemented using the same frequency resources but NR and LTE are differentiated using time division multiplexing (TDM). For example, NR may use LTE multicast-broadcast single frequency network (MBSFN) subframes, where there are up to a maximum of six LTE MBSFN subframes in each radio frame, as shown in FIG. 3. As shown in FIG. 3, six LTE MBSFN subframes 302 (subframes 1, 2, 3, 6, 7, 8) are used for NR transmissions, and the remaining subframes 304 are used for LTE transmissions. Another implementation is to use separate frequency resources and implement NR as a secondary carrier in a multi-carrier operation. Here, LTE uses one frequency carrier 402 and NR uses another frequency carrier 404 as shown in FIG. 4.

It will be appreciated that an MBSFN subframe consists of an LTE control region and a blank region. The LTE control region contains LTE control channels (e.g. physical downlink control channel (PDCCH), physical hybrid-ARQ indicator channel (PHICH)) and cell-specific reference signals (CRS). The blank region is not modulated. The reason for having an LTE control channel region in the MBSFN subframe is to allow the gNodeB to signal to the UE the following:

PHICH provides ACK/NACK information related to previous uplink transmissions from the UE.

PDCCH is used for indicating uplink allocations to the UE. The gNodeB signals a PDCCH to the UE to assign a physical uplink shared channel (PUSCH) in a future subframe. The PUSCH is transmitted in a future subframe and is not impacted by MBSFN transmissions (since PUSCH is an uplink transmission, not a downlink transmission). Note that the UE monitors for "PDCCH indicating uplink allocations" by performing blind decoding for downlink control information (DCI) format 0 or DCI format 4.

PDCCH for indicating transmit power control commands to the UE. Note that the UE monitors for these by blind decoding for DCI formats 3 or 3A.

However, the LTE UE does not monitor for PDCCH indicating downlink allocations to the UE in an MBSFN subframe. In LTE, there is a rule that states that the PDCCH allocating downlink resources to the UE in subframe 'n' relates to a PDSCH in subframe 'n'. Since there is no PDSCH region in MBSFN subframes, it is evident that there is no point in the UE monitoring PDCCH for downlink allocations in MBSFN subframes. As such, the UE does not need to blind decode for DCI formats 1->2C in MBSFN subframes.

Figure 5:
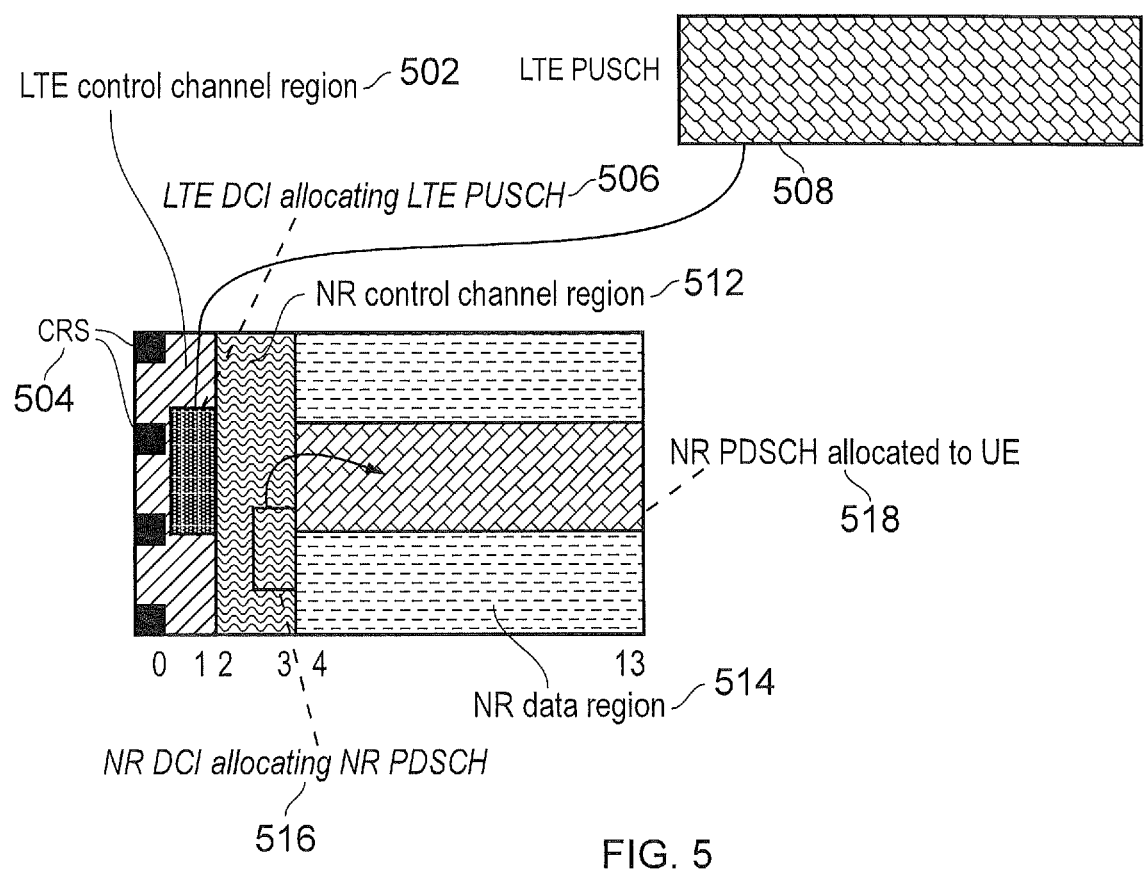
FIG. 5 shows an example of a multicast-broadcast single-frequency network (MBSFN) subframe used to support a LTE/NR coexistence.

When NR occupies an MBSFN subframe (as discussed above, for example with reference to the subframes 302 in FIG. 3), the NR transmission does not occupy the LTE control channel region. FIG. 5 shows the structure of an MBSFN subframe used to transmit NR. The subframe consists of an LTE control channel region 502 occupying OFDM symbols 0 and 1. The LTE control channel region 502 also contains LTE CRS 504. The NR region of the subframe occupies OFDM symbols 2 to 13 (where the OFDM symbol duration is defined with reference to LTE), and comprises an NR control channel region 512 and an NR data region 514. The NR region can implement a different numerology to the numerology of the LTE region. It is evident that if an NR UE is to be scheduled in an MBSFN subframe, such as the one shown in FIG. 5, there is inefficiency in that the NR control channel occupies NR resources, even though the LTE control channel may not be used to serve LTE UEs. As can be seen in FIG. 5, an LTE DCI 506 in the LTE control channel region (e.g. DCI format 0) may allocate LTE PUSCH 508 in a future subframe and an NR DCI 516 in the NR control channel region 512 allocating NR PDSCH 518 in the NR data region 514 in the same subframe.

NR-LTE coexistence may serve UEs that are only capable of LTE or only capable of NR (i.e. LTE UEs occupy LTE portions of the resource, such as subframes 304 in FIG. 3 and NR UEs occupy NR portions of the resource, such as subframes 302 in FIG. 3). It is also expected that some UEs may be both LTE and NR capable and hence some interworking between NR and LTE would be beneficial for such UEs.

It is well understood that it is inefficient from a statistical multiplexing perspective to dedicate some fixed resource for one type of UE and dedicate some other fixed resource for another type of UE. Consider for example, the frame structure of FIG. 3. If data arrives for an LTE UE in subframe 1, that data cannot be scheduled to the LTE UE, even if there are no NR UEs active in subframe 1; the UE can only be scheduled in subframe 4, at which time there may be other LTE UEs that need to be served.

In [5] it is proposed that LTE can be further evolved to allow higher degree of adaptation/flexibility in time/frequency for enhanced NR-LTE inter-working. Embodiments of the present technique are related to methods for NR-LTE inter-working. Embodiments of the present technique are related to the concept of a master RAT, or anchor carrier. The master RAT/anchor carrier is the base RAT technology that the cell operates on. Downlink control channel signaling is carried on the master RAT. In FIG. 3, LTE is the master RAT and the NR system is inserted into the LTE frame structure. However, as would be appreciated by those skilled in the art, embodiments of the present technique could equally apply to either NR or LTE as the master RAT.

Inter-RAT Scheduling for NR-LTE Interworking

Embodiments of the present technique introduce a new Inter-RAT Downlink Control Information (i-RAT DCI) that enables one RAT, for example LTE, to schedule resources in another RAT, for example NR. The i-RAT DCI can be carried by LTE physical channels such as PDCCH or EPDCCH (i.e. in LTE transmissions). When the i-RAT DCI schedules a downlink transmission in the NR resource an NR-PDSCH is used to carry the data to the UE. Similarly when the i-RAT DCI schedules an uplink grant in the NR resource, the UE will transmit a NR-PUSCH to the network. Although it is expected that the LTE to be the anchor carrier or the master RAT, in some embodiments of the present technique, the i-RAT DCI can also be carried by a NR-PDCCH.

Figure 6:
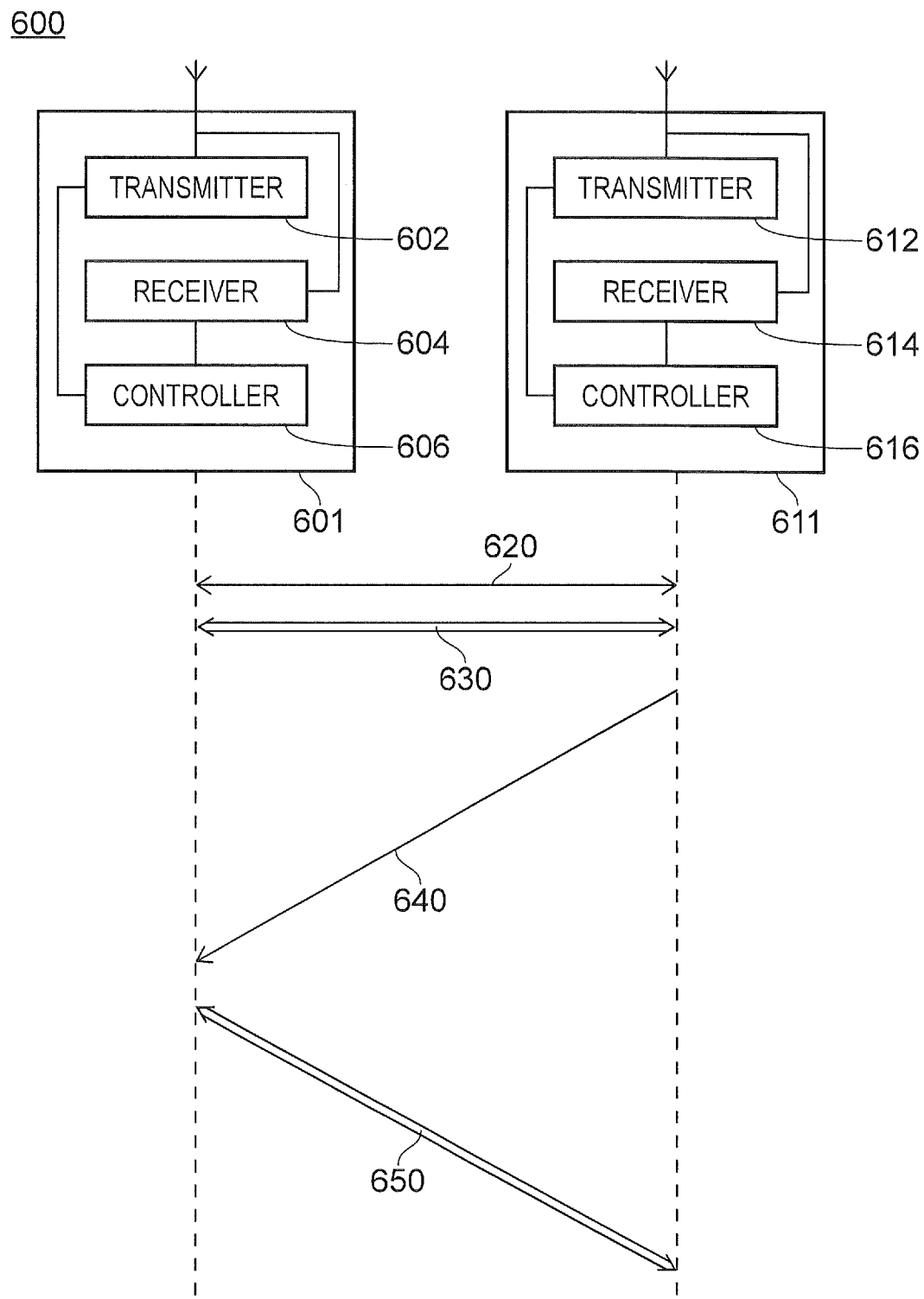
FIG. 6 is a part schematic representation, part message flow diagram of communications between a communications device and an infrastructure equipment of a wireless communications network in accordance with embodiments of the present technique.

A first embodiment of the present technique is described with relation to FIG. 6. FIG. 6 illustrates a method of communicating in a wireless telecommunications system 600 comprising a communications device 601 and one or more infrastructure equipment 611, which each comprise a transmitter (or transmitter circuitry) 602, 612, a receiver (or receiver circuitry) 604, 614 and a controller (or controller circuitry 606, 616. Each of the controllers 606, 616 may be, for example, a microprocessor, a CPU, or a dedicated chipset, etc. The communications device 601 is configured to transmit signals to and receive signals from the infrastructure equipment 611 via a first wireless access interface 620 in accordance with a first radio access technology, RAT, and to transmit signals to and receive signals from the infrastructure equipment 611 via a second wireless access interface 630 in accordance with a second RAT, the second RAT being different to the first RAT. The method comprises receiving 640, at the communications device 601 via the first wireless access interface 620, control signalling from one of the infrastructure equipment 611, the control signalling comprising an indication of first communications resources to be used by the communications device 601 to transmit/receive signals representing data to/from the one of the infrastructure equipment 611 via the second wireless access interface 630, and transmitting 650, from the communications device 601, the signals representing data to and/or receiving, at the communications device 601, the signals representing data from, using the first communications resources, the one of the infrastructure equipment 611 via the second wireless access interface 630. In other words, in an example relating to the first embodiment of the present technique, the i-RAT DCI transmits downlink and/or uplink grants to schedule NR resources in the downlink or uplink respectively.

Figure 7:
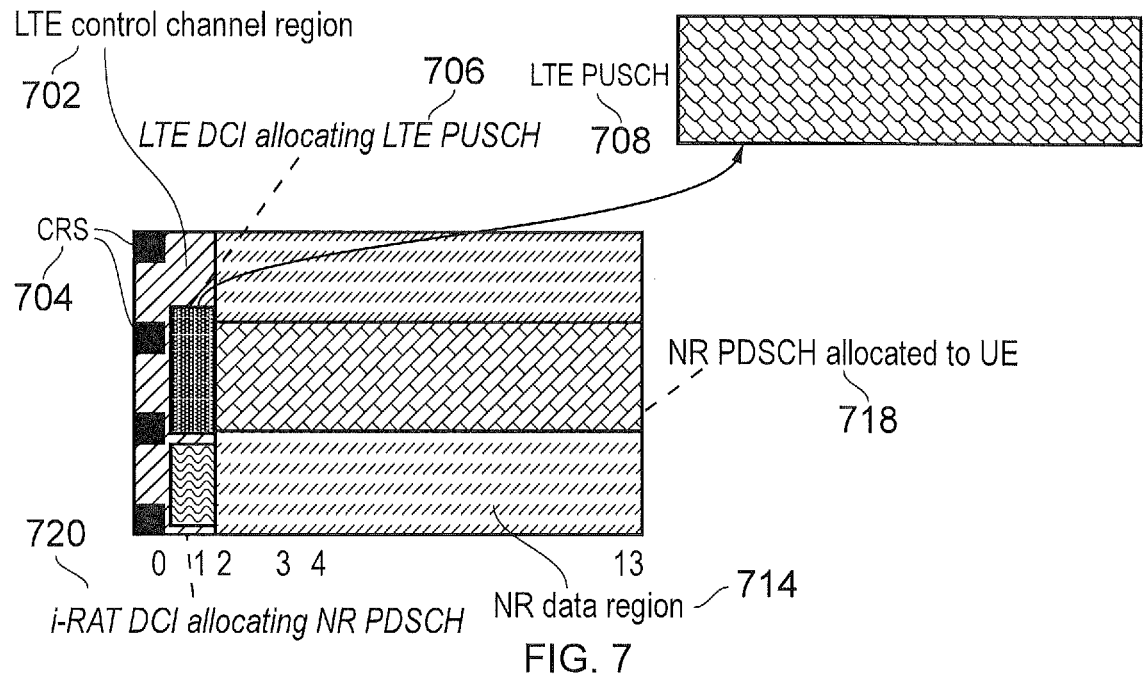
FIG. 7 shows an example of an inter-RAT downlink control information (i-RAT DCI) allocating NR-physical downlink shared channel (NR-PDSCH) resources to a UE in accordance with embodiments of the present technique.

Operation according to the first embodiment of the present technique as shown in FIG. 6 is shown in further detail in FIG. 7. FIG. 7 is adapted from the subframe structure illustrated in FIG. 5, and similarly shows an LTE DCI 706 allocating an LTE PUSCH 708 to a UE using the LTE control channel region 702, which may also contain LTE CRS 704. Although this is known in prior art systems, FIG. 7 also shows an i-RAT DCI 720 in the LTE control channel region 702 allocating an NR-PDSCH 718 to a UE in the NR data region 714. Such a structure provides various advantages when compared to that shown in FIG. 5. In particular, a single control channel region is sufficient to support both LTE and NR UEs, and a separate NR control channel region is not required in the subframe.

In an example relating to the first embodiment of the present technique, the i-RAT DCI can also schedule downlink and/or uplink grants for LTE resources in addition to NR resources. When the i-RAT DCI schedules downlink or uplink in LTE resources the LTE PDSCH and LTE PUSCH are used. When the i-RAT DCI schedules downlink or uplink in NR resources the NR-PDSCH and NR-PUSCH are used. This example has the advantage that only a single DCI format is used for NR-LTE capable UE, such that the UE does not need to monitor two kinds of control region. This example is also useful for NR-LTE multi-carrier operation where the i-RAT DCI can provide a single grant that schedules resources in the LTE and NR resources. In other words, in this example, the method comprises receiving, at the communications device via the first wireless access interface, second control signalling from the one of the infrastructure equipment, the second control signalling comprising an indication of second communications resources to be used by the communications device to transmit/receive signals representing data to/from the one of the infrastructure equipment via the first wireless access interface.

Figure 8:
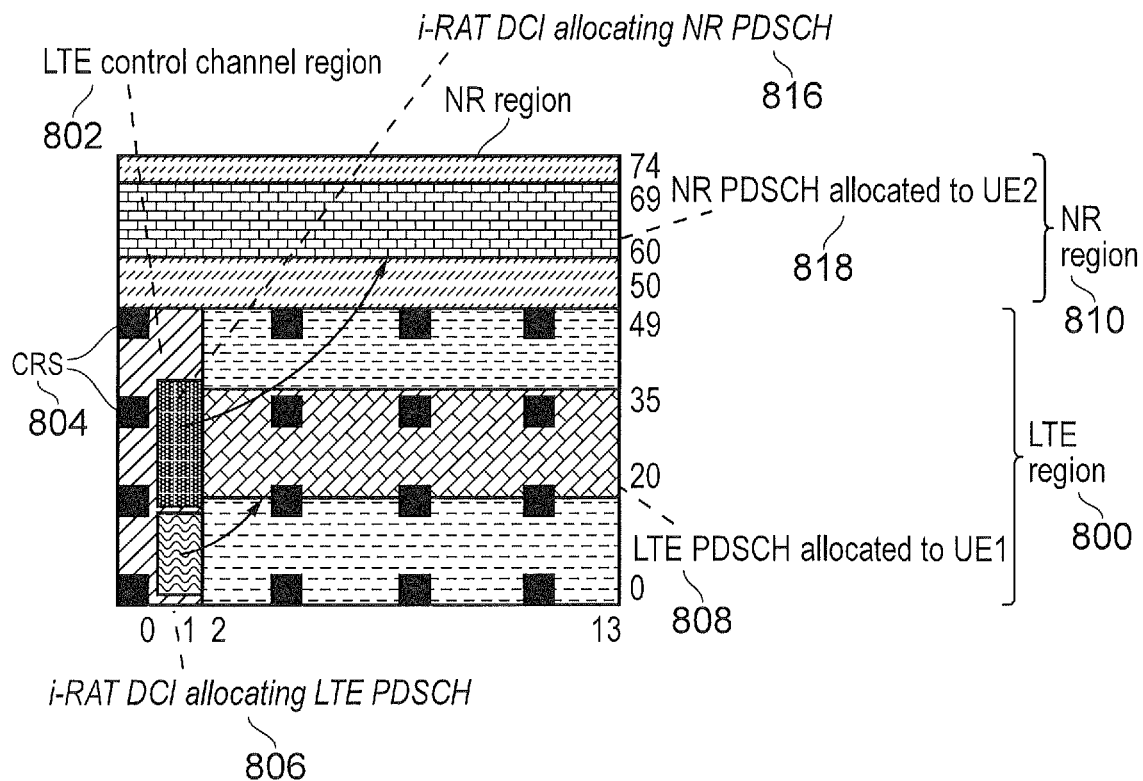
FIG. 8 shows an example of multiple i-RAT DCIs allocating NR-PDSCH resources and LTE-PDSCH resources in accordance with embodiments of the present technique.

Such an example is illustrated in FIG. 8, which shows an arrangement where a carrier has an NR region 810 and an LTE region 800. The NR region 810 is frequency multiplexed with the LTE region 800 and the NR region 810 does not have its own control channel. FIG. 8 shows a first UE being allocated LTE PDSCH 808 in the LTE region 800 using an i-RAT DCI 806 in the LTE control channel region 802, which also comprises LTE CRS 804. The first UE interprets the allocation as being an allocation of LTE PDSCH 808 since the resources allocated to the UE (PRBs 20->35 inclusive) are within the LTE region 800 (PRBs 0->49 inclusive).

FIG. 8 also shows a second UE being allocated NR PDSCH 818 in the NR region 810 using an i-RAT DCI 816 in the LTE control channel region 802. The second UE interprets the allocation as being an allocation of NR PDSCH 818 since the resources allocated to the UE (PRBs 60->69 inclusive) are within the NR region 810 (PRBs 50->74 inclusive). The second UE also interprets the NR PDSCH 818 allocation as occupying OFDM symbols 0->13 inclusive, since the NR region 810 has been defined in this case to not have an NR control channel region. In contrast, the first UE interprets the LTE PDSCH allocation 808 as occupying OFDM symbols 2->13 inclusive, since it is known to the first UE that the LTE control channel region 802 occupies OFDM symbols 0 and 1.

In embodiments of the present technique, NR and LTE may be differentiated using frequency division multiplexing (FDM) or by time division multiplexing (TDM). In other words, the first communications resources comprise first frequency sub-bands and the second communications resources comprise second frequency sub-bands, the first frequency sub-bands being separated in frequency from the second frequency sub-bands, or the first communications resources comprise first temporal units and the second communications resources comprise second temporal units, the first temporal units being separated in time from the second temporal units.

Figure 9:
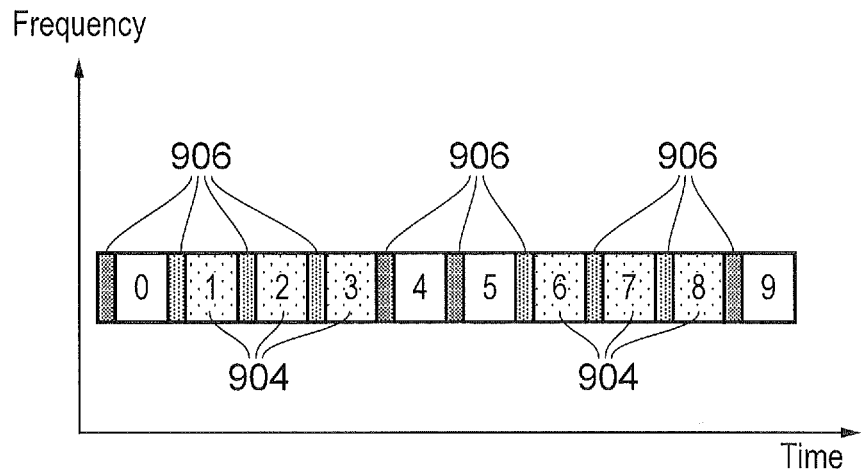
FIG. 9 shows an example of i-RAT DCI in LTE MBSFN subframes in accordance with embodiments of the present technique.

In an example where the NR and LTE are differentiated using TDM, the i-RAT DCI is transmitted using LTE PDCCH 902 in the MBSFN subframes 904 as shown in FIG. 9, where the maximum number of MBSFN subframes (i.e. six) are configured. In this example, a LTE only UE would not decode the PDCCH for a downlink allocation in MBSFN subframes whilst a NR capable or LTE and NR capable UE would blind decode for a PDCCH for a downlink allocation using an i-RAT DCI. It should be appreciated there may not be any NR scheduling in these MBSFN subframes. It should also be appreciated that in MBSFN subframes, an LTE UE would monitor for LTE PDDCH carrying DCI allocating uplink resources and PHICH. In other words, in this example, the method comprises receiving, at the communications device via the first wireless access interface, downlink control information from one of the infrastructure equipment, and, if the communications device is a communications device capable of transmitting signals to and receiving signals from the infrastructure equipment via the second wireless access interface, decoding, at the communications device, the downlink control information. In this instance, and in embodiments of the present technique, the term "decoding" means blind decoding. Blind decoding is a term of art in relation to wireless telecommunications systems, and is a process which depends on making a number of decoding attempts on PDCCH candidate locations for a number of defined DCI formats. As such, those skilled in the art would differentiate between the steps of receiving the DCI, and decoding it.

Figure 10:
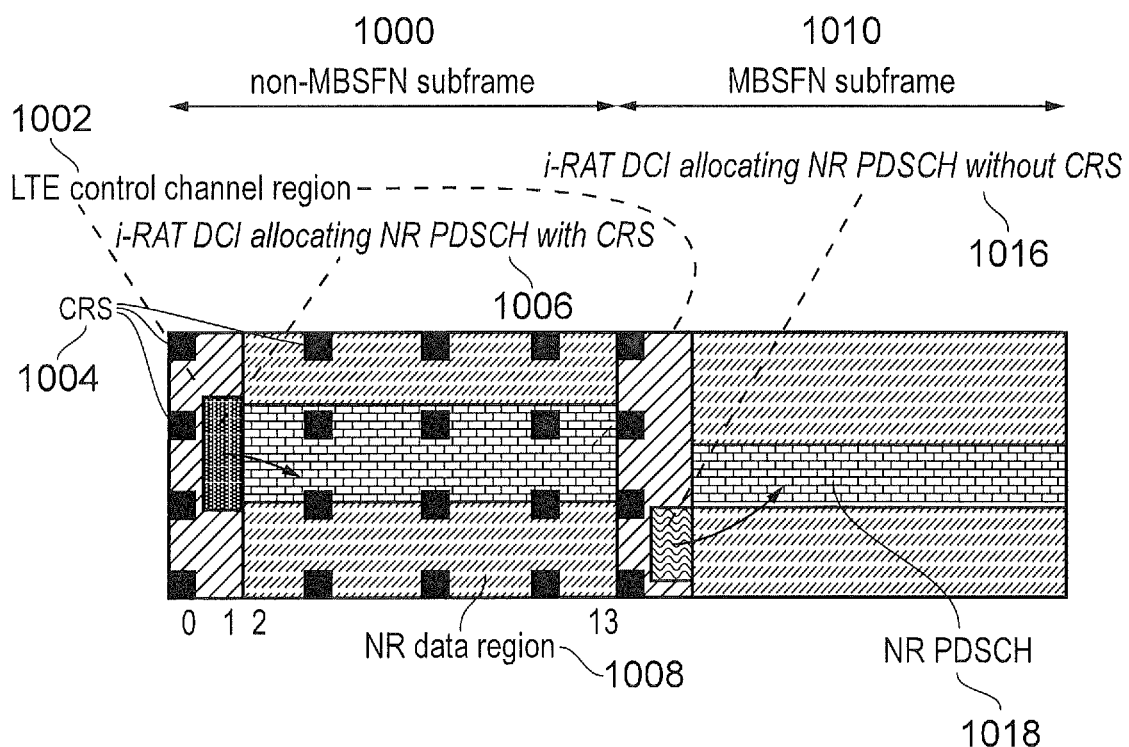
FIG. 10 shows an example of the scheduling of NR-PDSCH resources in non-MBSFN subframes and MBSFN subframes in accordance with embodiments of the present technique.

In an example where NR and LTE are differentiated using TDM, the i-RAT DCI can schedule NR resources in non-MBSFN subframes. Here the i-RAT DCI indicates the presence of LTE CRS so that the UE processing the NR signal would avoid (e.g. rate match or puncture) these LTE CRS. FIG. 10 shows the operation of this example. In a non-MBSFN subframe 1000, the UE is allocated NR-PDSCH in the NR data region 1008 and the i-RAT DCI 1006 in the LTE control channel region 1002 indicates to the UE that this NR-PDSCH allocation contains CRS 1004. In an MBSFN subframe 1010, the UE is allocated NR-PDSCH 1018 and the i-RAT DCI 1016 in the LTE control channel region 1002 indicates to the UE that this NR-PDSCH 1018 allocation does not contain CRS 1004. In other words, in this example, the method comprises receiving, at the communications device, with the control signalling, if the first temporal units are temporal units of a multicast-broadcast, single-frequency network, MBSFN, an indication that the first communications resources comprise no cell-specific reference signals, or receiving, at the communications device, with the control signalling, if the first temporal units are not temporal units of a MBSFN, an indication that the first communications resources comprise one or more cell-specific reference signals.

It should be appreciated that, in other examples of embodiments of the present technique, the UE can implicitly determine whether the NR PDSCH allocation contains CRS or not. The NR UE may be informed of which subframes contain CRS and which subframes don't (e.g. an NR SIB carries information on which subframes are MBSFN subframes and which subframes are non-MBSFN subframes). The UE then decodes the NR-PDSCH using the implicitly derived knowledge of whether the subframe contains CRS or not.

In an example, the UE can be allocated with either the i-RAT DCI in the LTE control channel region or with the NR DCI in the NR control channel region, for the case where both an LTE control channel region and an NR control channel region are active in the subframe. For example, in an MBSFN subframe containing NR, the UE can be allocated either with an i-RAT DCI in the LTE control channel region or with an NR DCI in the NR control channel region. There are various options for the decoding of the i-RAT DCI and the NR DCI:

The UE blind decodes for both the i-RAT DCI in the LTE control channel region and the NR DCI in the NR control channel region. In other words, where the control signalling is first control signalling, the method comprises receiving, at the communications device via the second wireless access interface, second control signalling from one of the infrastructure equipment, the second control signalling comprising an indication of the first communications resources, and attempting to decode, at the communications device, each of the first control signalling and the second control signalling to identify the first communications resources.

A Broadcast Control Channel (BCCH) in the NR section of the subframe indicates whether the full NR control channel region exists. If it exists, the UE decodes for the NR DCI in the NR control channel region (and also potentially for the i-RAT DCI in the LTE control channel region). In other words, where the control signalling is first control signalling, the method comprises receiving, at the communications device via the second wireless access interface, second control signalling from one of the infrastructure equipment, the second control signalling comprising an indication of the first communications resources, determining, by the communications device, whether the second control signalling comprises, in a broadcast control channel region, an indication that a full control channel region in accordance with the second RAT exists, and attempting to decode, at the communications device, the second control signalling to identify the first communications resources. The method may also comprise attempting to decode, at the communications device, the first control signalling in addition to the second control signalling.

A radio network temporary identifier, or RNTI, (NRCE-RNTI—"NR control exists RNTI") is used in the LTE control channel region to indicate that the NR control channel region exists. If it exists, the UE decodes for the NR DCI in the NR control channel region (and also potentially for the i-RAT DCI in the LTE control channel region). In other words, where the control signalling is first control signalling, the method comprises receiving, at the communications device via the second wireless access interface, second control signalling from one of the infrastructure equipment, the second control signalling comprising an indication of the first communications resources, determining, by the communications device, whether the first control signalling comprises a radio network temporary identifier, RNTI, indicating that a full control channel region in accordance with the second RAT exists, and attempting to decode, at the communications device, the second control signalling to identify the first communications resources. The method may also comprise attempting to decode, at the communications device, the first control signalling in addition to the second control signalling.

Figure 11:
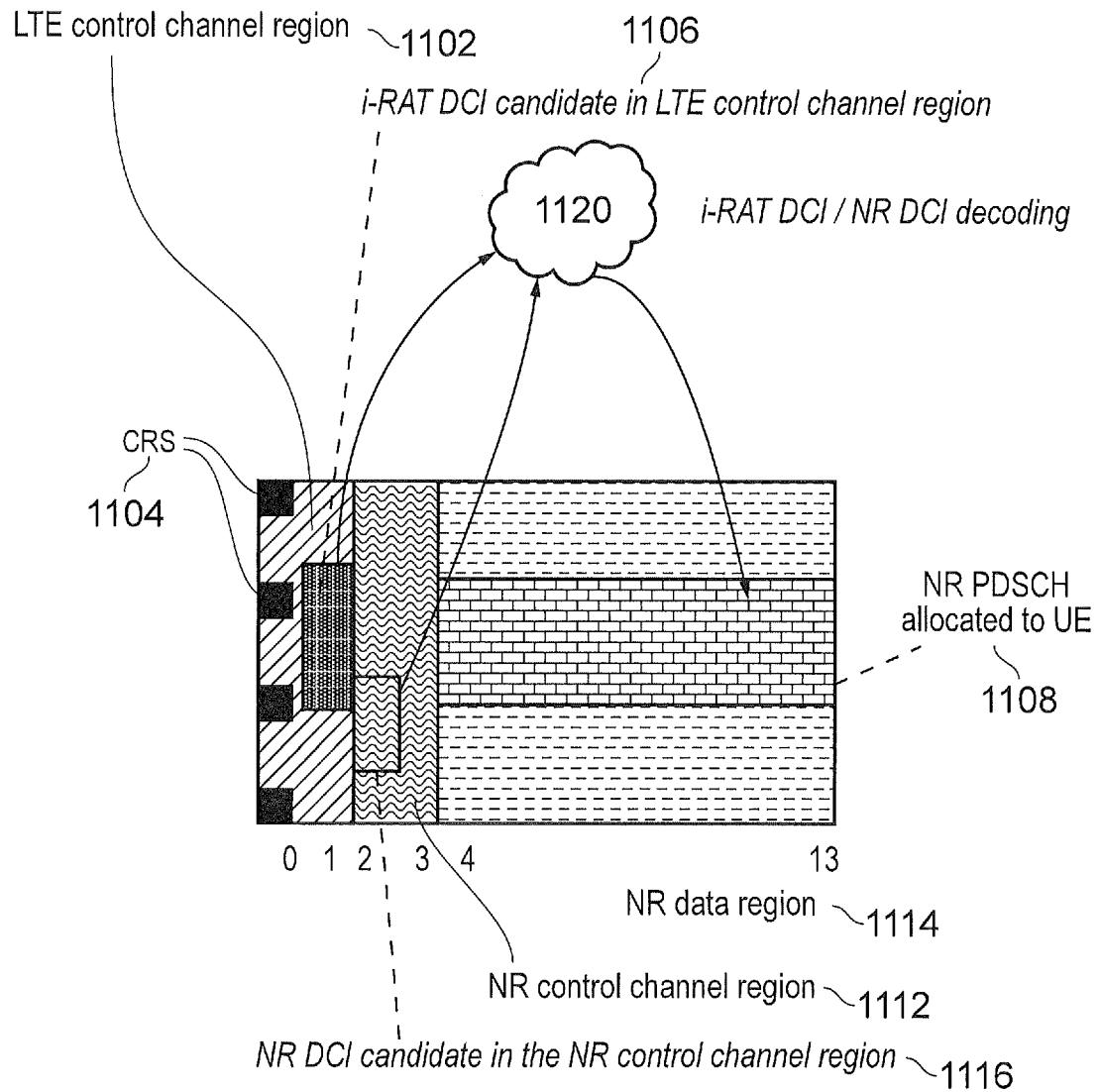
FIG. 11 shows an example of the allocation of NR-PDSCH resources using either an i-RAT DIC in the LTE control channel region or an NR-DCI in the NR control channel region in accordance with embodiments of the present technique.

Operation of this example is shown in FIG. 11. FIG. 11 shows an NR UE that can be allocated with NR PDSCH 1108 either using an i-RAT DCI 1106 in the LTE control channel region 1102, which may also include LTE CRS 1104, or an NR DCI 1116 in the NR control channel region 1112. The UE decodes 1120 both the i-RAT DCI 1106 and the NR DCI 1116. The number of blind decoding candidates of the UE can be split between the i-RAT DCI 1106 and the NR DCI 1116 (for example the UE may have sixteen blind decoding candidates in total, where eight of these candidates are applied to the i-RAT DCI 1106 and eight of these candidates are applied to the NR DCI 1116). Based on both the i-RAT DCI 1106 candidates and NR DCI 1116 candidates, the UE determines its NR PDSCH 1108 allocation and proceeds to decode that allocation. This example provides more statistical multiplexing opportunities when there are many NR UEs that need to be multiplexed in the NR region 1114 of an MBSFN subframe, since the NR PDSCH 1108 may be allocated either by the NR control channel region 1112 or the LTE control channel region 1102.

In a second embodiment of the present technique, an inter-RAT Uplink Control Information (i-RAT UCI) is also introduced. Similarly to the i-RAT DCI, the i-RAT UCI carries physical uplink control information for NR using the LTE PUCCH or LTE PUSCH. UCI carried by the i-RAT UCI includes HARQ ACK/NACK for NR-PDSCH, CSI, CQI, PMI for NR transmissions. In other words, the second embodiment of the present technique relates to a method of communicating in a wireless telecommunications system comprising a communications device and one or more infrastructure equipment, wherein the communications device is configured to transmit signals to and receive signals from the infrastructure equipment via a first wireless access interface in accordance with a first radio access technology, RAT, and to transmit signals to and receive signals from the infrastructure equipment via a second wireless access interface in accordance with a second RAT, the second RAT being different to the first RAT, the method comprising transmitting, by the communications device via the first wireless access interface, control signalling to one of the infrastructure equipment, the control signalling comprising physical uplink control information to be used by the one of the infrastructure equipment, the physical uplink control information relating to the second RAT.

In an example, where NR and LTE are differentiated using TDM, the i-RAT UCI also carries uplink reference signals (SRS) for channel sounding purposes at the gNodeB. In other words, this example relates to the second embodiment of the present technique, wherein the first wireless access interface is divided into first temporal units and the second wireless access interface is divided into second temporal units, the first temporal units being separated in time from the second temporal units, and wherein the control signalling further comprises a sounding reference signal to be used by the one of the infrastructure equipment to estimate a quality of the second wireless access interface.

There is a significant amount of engineering development work required to introduce a new RAT, such as NR. An advantage of using i-RAT DCI and i-RAT UCI carried by LTE physical channels such as PDCCH/EPDCCH and PUCCH is that the UE and gNodeB in the initial stage can avoid implementing NR control channels, since there may be very little reuse of engineering design between the NR and LTE control channels (for example, the LTE control channels are based on tail-biting convolutional codes (TBCCs), whereas the NR control channels are based on polar codes). This would reduce complexity in initial deployment of NR systems, allowing for wider, faster and cheaper deployment of such systems.

The following numbered paragraphs provide further example aspects and features of the present technique:

Paragraph 1. A method of communicating in a wireless telecommunications system comprising a communications device and one or more infrastructure equipment, wherein the communications device is configured to transmit signals to and receive signals from the infrastructure equipment via a first wireless access interface in accordance with a first radio access technology, RAT, and to transmit signals to and receive signals from the infrastructure equipment via a second wireless access interface in accordance with a second RAT, the second RAT being different to the first RAT, the method comprising receiving, at the communications device via the first wireless access interface, control signalling from one of the infrastructure equipment, the control signalling comprising an indication of first communications resources to be used by the communications device to transmit/receive signals representing data to/from the one of the infrastructure equipment via the second wireless access interface, and transmitting, from the communications device, the signals representing data to and/or receiving, at the communications device, the signals representing data from, using the first communications resources, the one of the infrastructure equipment via the second wireless access interface.

Paragraph 2. A method according to Paragraph 1, comprising receiving, at the communications device via the first wireless access interface, second control signalling from the one of the infrastructure equipment, the second control signalling comprising an indication of second communications resources to be used by the communications device to transmit/receive signals representing data to/from the one of the infrastructure equipment via the first wireless access interface.

Paragraph 3. A method according to Paragraph 2, wherein the first communications resources comprise first frequency sub-bands and the second communications resources comprise second frequency sub-bands, the first frequency sub-bands being separated in frequency from the second frequency sub-bands.

Paragraph 4. A method according to Paragraph 2, wherein the first communications resources comprise first temporal units and the second communications resources comprise second temporal units, the first temporal units being separated in time from the second temporal units.

Paragraph 5. A method according to Paragraph 4, comprising receiving, at the communications device via the first wireless access interface, downlink control information from one of the infrastructure equipment, and, if the communications device is a communications device capable of transmitting signals to and receiving signals from the infrastructure equipment via the second wireless access interface, decoding, at the communications device, the downlink control information.

Paragraph 6. A method according to Paragraph 4, comprising receiving, at the communications device, with the control signalling, if the first temporal units are temporal units of a multicast-broadcast, single-frequency network, MBSFN, an indication that the first communications resources comprise no cell-specific reference signals, or receiving, at the communications device, with the control signalling, if the first temporal units are not temporal units of a MBSFN, an indication that the first communications resources comprise one or more cell-specific reference signals.

Paragraph 7. A method according to any of Paragraphs 1 to 6, the control signalling being first control signalling, the method comprising receiving, at the communications device via the second wireless access interface, second control signalling from one of the infrastructure equipment, the second control signalling comprising an indication of the first communications resources, and attempting to decode, at the communications device, each of the first control signalling and the second control signalling to identify the first communications resources.

Paragraph 8. A method according to any of Paragraphs 1 to 7, the control signalling being first control signalling, the method comprising receiving, at the communications device via the second wireless access interface, second control signalling from one of the infrastructure equipment, the second control signalling comprising an indication of the first communications resources, determining, by the communications device, whether the first communications resources comprise, in a broadcast control channel region, an indication that a full control channel region in accordance with the second RAT exists, and attempting to decode, at the communications device, the second control signalling to identify the first communications resources.

Paragraph 9. A method according to any of Paragraphs 1 to 8, the control signalling being first control signalling, the method comprising receiving, at the communications device via the second wireless access interface, second control signalling from one of the infrastructure equipment, the second control signalling comprising an indication of the first communications resources, determining, by the communications device, whether the first control signalling comprises a radio network temporary identifier, RNTI, indicating that a full control channel region in accordance with the second RAT exists, and attempting to decode, at the communications device, the second control signalling to identify the first communications resources.

Paragraph 10. A method according to Paragraph 8 or Paragraph 9, comprising attempting to decode, at the communications device, the first control signalling in addition to the second control signalling.

Paragraph 11. A communications device configured to communicate with a wireless telecommunications network comprising one or more infrastructure equipment, the communications device comprising transmitter circuitry configured to transmit signals to the infrastructure equipment via a first wireless access interface in accordance with a first radio access technology, RAT, and to transmit signals to the infrastructure equipment via a second wireless access interface in accordance with a second RAT, the second RAT being different to the first RAT, receiver circuitry configured to receive signals from the infrastructure equipment via the first wireless access interface in accordance with the first RAT, and to receive signals from the infrastructure equipment via the second wireless access interface in accordance with the second RAT, and controller circuitry configured to control the transmitter circuitry to transmit the signals and to control the receiver circuitry to receive the signals, the controller circuitry being configured in combination with the transmitter circuitry and the receiver circuitry to receive via the first wireless access interface control signalling from one of the infrastructure equipment, the control signalling comprising an indication of first communications resources to be used by the communications device to transmit/receive signals representing data to/from the one of the infrastructure equipment via the second wireless access interface, and to transmit the signals representing data to and/or to receive the signals representing data from, using the first communications resources, the one of the infrastructure equipment via the second wireless access interface.

Paragraph 12. A method of operating a communications device in a wireless telecommunications system comprising one or more infrastructure equipment, wherein the communications device is configured to transmit signals to and receive signals from the infrastructure equipment via a first wireless access interface in accordance with a first radio access technology, RAT, and to transmit signals to and receive signals from the infrastructure equipment via a second wireless access interface in accordance with a second RAT, the second RAT being different to the first RAT, the method comprising receiving via the first wireless access interface control signalling from one of the infrastructure equipment, the control signalling comprising an indication of first communications resources to be used by the communications device to transmit/receive signals representing data to/from the one of the infrastructure equipment via the second wireless access interface, and transmitting the signals representing data to and/or receiving the signals representing data from, using the first communications resources, the one of the infrastructure equipment via the second wireless access interface.

Paragraph 13. Circuitry for a communications device configured to communicate with a wireless telecommunications network comprising one or more infrastructure equipment, the communications device comprising transmitter circuitry configured to transmit signals to the infrastructure equipment via a first wireless access interface in accordance with a first radio access technology, RAT, and to transmit signals to the infrastructure equipment via a second wireless access interface in accordance with a second RAT, the second RAT being different to the first RAT, receiver circuitry configured to receive signals from the infrastructure equipment via the first wireless access interface in accordance with the first RAT, and to receive signals from the infrastructure equipment via the second wireless access interface in accordance with the second RAT, and controller circuitry configured to control the transmitter circuitry to transmit the signals and to control the receiver circuitry to receive the signals, the controller circuitry being configured in combination with the transmitter circuitry and the receiver circuitry to receive via the first wireless access interface control signalling from one of the infrastructure equipment, the control signalling comprising an indication of first communications resources to be used by the communications device to transmit/receive signals representing data to/from the one of the infrastructure equipment via the second wireless access interface, and to transmit the signals representing data to and/or to receive the signals representing data from, using the first communications resources, the one of the infrastructure equipment via the second wireless access interface.

Paragraph 14. A method of communicating in a wireless telecommunications system comprising a communications device and one or more infrastructure equipment, wherein the communications device is configured to transmit signals to and receive signals from the infrastructure equipment via a first wireless access interface in accordance with a first radio access technology, RAT, and to transmit signals to and receive signals from the infrastructure equipment via a second wireless access interface in accordance with a second RAT, the second RAT being different to the first RAT, the method comprising transmitting, by the communications device via the first wireless access interface, control signalling to one of the infrastructure equipment, the control signalling comprising physical uplink control information to be used by the one of the infrastructure equipment, the physical uplink control information relating to the second RAT.

Paragraph 15. A method according to Paragraph 14, wherein the first wireless access interface is divided into first temporal units and the second wireless access interface is divided into second temporal units, the first temporal units being separated in time from the second temporal units, and wherein the control signalling further comprises a sounding reference signal to be used by the one of the infrastructure equipment to estimate a quality of the second wireless access interface.

Paragraph 16. A communications device configured to communicate with a wireless telecommunications network comprising one or more infrastructure equipment, the communications device comprising transmitter circuitry configured to transmit signals to the infrastructure equipment via a first wireless access interface in accordance with a first radio access technology, RAT, and to transmit signals to the infrastructure equipment via a second wireless access interface in accordance with a second RAT, the second RAT being different to the first RAT, receiver circuitry configured to receive signals from the infrastructure equipment via the first wireless access interface in accordance with the first RAT, and to receive signals from the infrastructure equipment via the second wireless access interface in accordance with the second RAT, and controller circuitry configured to control the transmitter circuitry to transmit the signals and to control the receiver circuitry to receive the signals, the controller circuitry being configured in combination with the transmitter circuitry and the receiver circuitry, to transmit via the first wireless access interface control signalling to one of the infrastructure equipment, the control signalling comprising physical uplink control information to be used by the one of the infrastructure equipment, the physical uplink control information relating to the second RAT.

Paragraph 17. A method of operating a communications device in a wireless telecommunications system comprising one or more infrastructure equipment, wherein the communications device is configured to transmit signals to and receive signals from the infrastructure equipment via a first wireless access interface in accordance with a first radio access technology, RAT, and to transmit signals to and receive signals from the infrastructure equipment via a second wireless access interface in accordance with a second RAT, the second RAT being different to the first RAT, the method comprising transmitting via the first wireless access interface control signalling to one of the infrastructure equipment, the control signalling comprising physical uplink control information to be used by the one of the infrastructure equipment, the physical uplink control information relating to the second RAT.

Paragraph 18. Circuitry for a communications device configured to communicate with a wireless telecommunications network comprising one or more infrastructure equipment, the communications device comprising transmitter circuitry configured to transmit signals to the infrastructure equipment via a first wireless access interface in accordance with a first radio access technology, RAT, and to transmit signals to the infrastructure equipment via a second wireless access interface in accordance with a second RAT, the second RAT being different to the first RAT, receiver circuitry configured to receive signals from the infrastructure equipment via the first wireless access interface in accordance with the first RAT, and to receive signals from the infrastructure equipment via the second wireless access interface in accordance with the second RAT, and controller circuitry configured to control the transmitter circuitry to transmit the signals and to control the receiver circuitry to receive the signals, the controller circuitry being configured in combination with the transmitter circuitry and the receiver circuitry, to transmit via the first wireless access interface control signalling to one of the infrastructure equipment, the control signalling comprising physical uplink control information to be used by the one of the infrastructure equipment, the physical uplink control information relating to the second RAT.

Numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] R1-1612887, "Uplink operation for LTE+NR Dual Connectivity," Vodafone, RAN1 #87.
[2] LTE for UMTS: OFDMA and SC-FDMA Based Radio Access, Harris Holma and Antti Toskala, Wiley 2009, ISBN 978-0-470-99401-6.
[3] RP-151621, "New Work Item: NarrowBand IOT NB-IOT," Qualcomm, RAN #69.
[4] RP-160671, "New SID Proposal: Study on New Radio Access Technology," NTT DOCOMO, RAN #71.
[5] R1-1611681, "Coexistence between NR and LTE," Huawei, HiSilicon, RAN1 #87.

What is claimed is:

1. A method of communicating in a wireless telecommunications system comprising a communications device and one or more infrastructure equipment, wherein the communications device is configured to transmit signals to and receive signals from the one or more infrastructure equipment via a first wireless access interface in accordance with a first radio access technology (RAT) and to transmit signals to and receive signals from the one or more infrastructure equipment via a second wireless access interface in accordance with a second RAT, the second RAT being different to the first RAT, and the method comprising:
   receiving, at the communications device via the first wireless access interface, first control signalling from one of the one or more infrastructure equipment, the first control signalling comprising a first indication of first communications resources to be used by the communications device to transmit/receive signals representing data to/from the one infrastructure equipment via the second wireless access interface, the first control signalling being in a predefined control channel region as defined by a predefined frame structure associated with the first RAT, the predefined control channel region being at a beginning of the predefined frame structure, and
   transmitting, from the communications device, the signals representing data to and/or receiving, at the communications device, the signals representing data from, using the first communications resources, the one infrastructure equipment via the second wireless access interface,
   wherein the first control signalling is at an end of the predefined control channel region and starts after start of the predefined control channel region.

2. The method according to claim 1, comprising receiving, at the communications device via the first wireless access interface, second control signalling from the one infrastructure equipment, the second control signalling comprising a second indication of second communications resources to be used by the communications device to transmit/receive signals representing data to/from the one infrastructure equipment via the first wireless access interface.

3. The method according to claim 2, wherein the first communications resources comprise first frequency sub-bands and the second communications resources comprise second frequency sub-bands, the first frequency sub-bands being separated in frequency from the second frequency sub-bands.

4. The method according to claim 2, wherein the first communications resources comprise first temporal units and the second communications resources comprise second temporal units, the first temporal units being separated in time from the second temporal units.

5. The method according to claim 4, comprising:
   receiving, at the communications device via the first wireless access interface, downlink control information from the one infrastructure equipment, and, in a case where the communications device is capable of transmitting signals to and receiving signals from the one infrastructure equipment via the second wireless access interface,
   decoding, at the communications device, the downlink control information.

6. The method according to claim 4, comprising:
   receiving, at the communications device, with the first control signalling, in a first case where the first temporal units are temporal units of a multicast-broadcast, single-frequency network (MBSFN), a third indication that the first communications resources comprise no cell-specific reference signals, or
   receiving, at the communications device, with the first control signalling, in a second case where the first temporal units are not temporal units of a MBSFN, a fourth indication that the first communications resources comprise one or more cell-specific reference signals.

7. The method according to claim 1, wherein the method comprises:
   receiving, at the communications device via the second wireless access interface, second control signalling from the one infrastructure equipment, the second control signalling comprising a second indication of the first communications resources, and
   attempting to decode, at the communications device, each of the first control signalling and the second control signalling to identify the first communications resources.

8. The method according to claim 1, wherein the method comprises:
   receiving, at the communications device via the second wireless access interface, second control signalling from the one of the infrastructure equipment, the second control signalling comprising a second indication of the first communications resources,
   determining, by the communications device, whether the first communications resources comprise, in a broadcast control channel region, a third indication that a full control channel region in accordance with the second RAT exists, and attempting to decode, at the communications device, the second control signalling to identify the first communications resources.

9. The method according to claim 1, wherein the method comprises:

receiving, at the communications device via the second wireless access interface, second control signalling from the one infrastructure equipment, the second control signalling comprising a second indication of the first communications resources, determining, by the communications device, whether the first control signalling comprises a radio network temporary identifier (RNTI) indicating that a full control channel region in accordance with the second RAT exists, and attempting to decode, at the communications device, the second control signalling to identify the first communications resources.

10. The method according to claim 8, comprising:

attempting to decode, at the communications device, the first control signalling in addition to the second control signalling.

11. A communications device configured to communicate with a wireless telecommunications network comprising one or more infrastructure equipment, the communications device comprising:

transmitter circuitry configured to transmit signals to the one or more infrastructure equipment via a first wireless access interface in accordance with a first radio access technology (RAT) and to transmit signals to the one or more infrastructure equipment via a second wireless access interface in accordance with a second RAT, the second RAT being different to the first RAT, receiver circuitry configured to receive signals from the one or more infrastructure equipment via the first wireless access interface in accordance with the first RAT, and to receive signals from the one or more infrastructure equipment via the second wireless access interface in accordance with the second RAT, and controller circuitry configured to control the transmitter circuitry to transmit the signals and to control the receiver circuitry to receive the signals, wherein the controller circuitry is configured in combination with the transmitter circuitry and the receiver circuitry:

to receive via the first wireless access interface first control signalling from one of the one or more infrastructure equipment, the first control signalling comprising a first indication of first communications resources to be used by the communications device to transmit/receive signals representing data to/from the one infrastructure equipment via the second wireless access interface, the first control signalling being in a predefined control channel region as defined by a predefined frame structure associated with the first RAT, and to transmit the signals representing data to and/or to receive the signals representing data from, using the first communications resources, the one infrastructure equipment via the second wireless access interface, wherein the first control signalling is at an end of the predefined control channel region and starts after start of the predefined control channel region.

12. A communications device configured to communicate with a wireless telecommunications network comprising one or more infrastructure equipment, the communications device comprising:

transmitter circuitry configured to transmit signals to the one or more infrastructure equipment via a first wireless access interface in accordance with a first radio access technology (RAT) and to transmit signals to the one or more infrastructure equipment via a second wireless access interface in accordance with a second RAT, the second RAT being different to the first RAT, receiver circuitry configured to receive signals from the one or more infrastructure equipment via the first wireless access interface in accordance with the first RAT, and to receive signals from the one or more infrastructure equipment via the second wireless access interface in accordance with the second RAT, and controller circuitry configured to control the transmitter circuitry to transmit the signals and to control the receiver circuitry to receive the signals, wherein the controller circuitry is configured in combination with the transmitter circuitry and the receiver circuitry, to transmit via the first wireless access interface first control signalling to one of the infrastructure equipment, the first control signalling being in a predefined control channel region as defined by a predefined frame structure associated with the first RAT and comprising physical uplink control information to be used by the one infrastructure equipment, the physical uplink control information relating to the second RAT, and the predefined control channel region being at a beginning of the predefined frame structure, and wherein the first control signalling is at an end of the predefined control channel region and starts after start of the predefined control channel region.

13. The method according to claim 1, wherein the first control signalling is in a Multicast-Broadcast Single Frequency Network (MBSFN) subframe, and wherein the predefined control channel region as defined by the predefined frame structure associated with the first RAT is the only control channel region in the MBSFN subframe.

14. The method according to claim 1, comprising:

receiving, at the communications device via the first wireless access interface, second control signalling from the one infrastructure equipment, the second control signalling comprising a second indication of second communications resources to be used by the communications device to transmit/receive signals representing data to/from the one infrastructure equipment via the first wireless access interface, wherein the first control signalling includes one of Long Term Evolution Downlink Control Information (LTE DCI) or Inter-RAT Downlink Control Information (i-RAT DCI), wherein the second control signalling includes the other of the Long Term Evolution Downlink Control Information (LTE DCI) or the Inter-RAT Downlink Control Information (i-RAT DCI), and wherein the LTE DCI and the i-RAT DCI overlap in time and are completely separated in frequency.

15. The communication device according to claim 11, wherein the controller circuitry is configured in combination with the transmitter circuitry and the receiver circuitry to receive, via the first wireless access interface, second control signalling from the one infrastructure equipment, the second control signalling comprising a second indication of second communications resources to be used by the communications device to transmit/receive signals representing data to/from the one infrastructure equipment via the first wireless access interface.

16. The communication device according to claim 11, wherein the predefined control channel region as defined by the predefined frame structure associated with the first RAT is the only control channel region in a subframe having the first control signalling.

17. The communication device according to claim 11, wherein the controller circuitry is configured in combination with the transmitter circuitry and the receiver circuitry to receive, via the first wireless access interface, second control signalling from the one infrastructure equipment, the second control signalling comprising a second indication of second communications resources to be used by the communications device to transmit/receive signals representing data to/from the one infrastructure equipment via the first wireless access interface,
  wherein the first control signalling includes one of Long Term Evolution Downlink Control Information (LTE DCI) or Inter-RAT Downlink Control Information (i-RAT DCI),
  wherein the second control signalling includes the other of the Long Term Evolution Downlink Control Information (LTE DCI) or the Inter-RAT Downlink Control Information (i-RAT DCI), and
  wherein the LTE DCI and the i-RAT DCI overlap in time and are completely separated in frequency.

18. The communication device according to claim 12, wherein the controller circuitry is configured in combination with the transmitter circuitry and the receiver circuitry to receive, via the first wireless access interface, second control signalling from the one infrastructure equipment, the second control signalling comprising a second indication of second communications resources to be used by the communications device to transmit/receive signals representing data to/from the one infrastructure equipment via the first wireless access interface.

19. The communication device according to claim 12, wherein the first control signalling is in a Multicast-Broadcast Single Frequency Network (MBSFN) subframe.

20. The communication device according to claim 12, wherein the controller circuitry is configured in combination with the transmitter circuitry and the receiver circuitry to receive, via the first wireless access interface, second control signalling from the one infrastructure equipment, the second control signalling comprising a second indication of second communications resources to be used by the communications device to transmit/receive signals representing data to/from the one infrastructure equipment via the first wireless access interface,
  wherein the first control signalling includes one of Long Term Evolution Downlink Control Information (LTE DCI) or Inter-RAT Downlink Control Information (i-RAT DCI),
  wherein the second control signalling includes the other of the Long Term Evolution Downlink Control Information (LTE DCI) or the Inter-RAT Downlink Control Information (i-RAT DCI), and
  wherein the LTE DCI and the i-RAT DCI overlap in time and are completely separated in frequency.

* * * * *